United States Patent Office 3,330,878
Patented July 11, 1967

3,330,878
PROCESS FOR PRODUCING STYRENE
Harold A. Huckins, Jr., New Canaan, Conn., and Harold Gilman, Jackson Heights, and Theodore W. Stein, Hastings on Hudson, N.Y., assignors to Halcon International, Inc., a corporation of Delaware
No Drawing. Filed June 15, 1964, Ser. No. 375,306
7 Claims. (Cl. 260—669)

This invention relates to a new and improved process for the preparation of styrene. More specifically, this invention relates to the use of at least two dehydrogenation reactors with an intermediate indirect heating step.

In the preparation of styrene from ethyl benzene, it is desirable to obtain both high conversions and selectivities. In the past, conventional procedure resulted in conversion of only 40%, or, at most, 50%. A process with these low conversions is undesirable, since excessive recycle, which adds to the required distillation and reactor capacity, is necessary.

In accordance with the instant invention it has been found that conversion on the order of 70 to 80% can be achieved, while maintaining high selectivities, by using a plurality of reactor stages with a carefully controlled indirect heating step between each stage. Most importantly, the reheating step must be controlled so that a minimum residence time and pressure drop occurs between the reactor stages. Additionally, it is essential that the skin temperature of the furnace be carefully controlled. Feedstocks composed of a preponderance of ethyl benzene are required. Preferably, the hydrocarbon feed has at least 80%, most desirably 90%, ethyl benzene.

Specifically, in passing through the furnace, between the reactor stages, the residence time must be less than 5 seconds, preferably less than 1 second. A pressure drop of less than 5 or at most 10 p.s.i. are allowable. The maximum skin temperature i.e., the temperature of the furnace surface in contact with the reactor effluent, should, under no circumstances exceed 790° C. A maximum of 740° C. is preferred, and 700° C. most desirable.

The type of furnace employed, so long as the aforesaid conditions are met, may be readily selected by those skilled in the art. For example, radiant heating or indirect heating by circulating a hot fluid may be employed. Similarly, the diameter and configuration of the tubes in the furnace may be readily selected by those skilled in the art.

The variables defined above are readily controlled so that the material passing into each reaction stage is at essentially the same temperature. The particular reaction conditions are shown in the following table:

TABLE 1

|  | Broad | Preferred | Most Desirable |
|---|---|---|---|
| Temperature, °C | 675–550 | 665–570 | 655–580 |
| Pressure, atm | 1–3 | 1–2 | (*) |
| Steam, lbs./lbs. ethyl benzene | 5–1 | 4–1.5 | 3.6–1.8 |
| Total Residence Time, sec. |  |  |  |
| Equivalent at 1 atm | 0.2–1.2 | 0.5–1.0 | 0.3–.8 |

*About atmospheric.

While as many as five reaction stages may be used, preferably two stages are employed. Preferably, a ferric oxide-potassium oxide catalyst is used. However, other well known catalysts such as magnesium oxide-ferrous oxide-potassium carbonate, alumina-silica-nickel or other well known dehydrogenation catalyst are suitable.

To further illustrate the instant invention attention is directed to the following example.

*Example*

Ethyl benzene and water in a ratio of 0.58 pound of water per pound of ethyl benzene at a temperature of 550° C. are heated by the addition of superheated steam to a reaction temperature of 630° C. The heated mixture, now having a weight ratio of water to ethyl benzene of 3:1, is introduced into a first dehydrogenation reactor having an iron oxide catalyst at a pressure of 2.1 atmospheres gauge. About 40% of the ethyl benzene is converted to styrene. In this reactor, the residence time is 0.6 second at 1 atmosphere. The effluent stream, at a temperature of 580° C. and a pressure of 1.3 atmospheres gauge, is passed to a furnace where it is reheated to 630° C. The pressure drop across the furnace is about 0.7 atmosphere and the skin temperature differential of the tubeside fluid reaches a maximum of 24° C.

The heated effluent then passes to the second dehydrogenation reactor which also contains iron oxide catalyst and passes therethrough with a residence time of 0.6 second measured at 1 atmosphere absolute. Approximately another 20% of the ethyl benzene, based on the initial ethyl benzene in the feed, is converted. The outlet temperature from the second reactor is 600° C. and the pressure 0.4 atmosphere absolute. The styrene formed is separated by conventional distillation procedure and an analysis shows a total conversion of about 63% at a selectivity of 92.5% to styrene.

While the above example illustrates a preferred embodiment of the invention many variations may be made without parting from its scope. For example, while it is preferable to introduce all of the steam into the first stage, most desirably at least 75%, the steam may be introduced at various points throughout the system. It is advantageous to introduce essentially all of the steam initially, since it lowers the partial pressure of the reactants and products, provides high heat capacity and therefore lessens the temperature drop through each stage, and assists in maintaining high selectivity.

The instant invention is markedly advantageous over a system where heat is supplied directly to the reactor, rather than an intermediate point. Overheating problems are avoided, and, since a smaller volume must be heated, a smaller furnace or other indirect heater and less heat are required.

The rapid heating between stages achieved herein cannot be achieved by merely adding steam between the reactors. Attempts to provide additional heat by steam alone have been unable to produce conversion in excess of about 50%, a result markedly inferior to that described herein.

As noted previously, the invention is applicable to processes using substantially high grade ethyl benzene feed. While hydrocarbon diluents will not destroy the efficacy of the claimed processes, at least if a majority of the feedstock is ethyl benzene, they are not desirable. Preferably, the feed contains 80% ethyl benzene, most desirably, over 90%.

Prior processes for the production of styrene from fractions containing only about 30% ethyl benzene in xylene are not adaptable for these high concentrations feed. Such processes operated at temperatures well above those set forth in Table 1 and resulted in very low selectivities and the formation of excessive amounts of by-products.

In view of the foregoing disclosures, variations and modifications thereof will be apparent to one skilled in the art, and it is intended to include within the invention all such variations and modifications except as do not come within the scope of the appended claims.

What is claimed is:
1. In a process for catalytically dehydrogenating an ethyl benzene feed containing at least 80% ethyl benzene at a temperature between 550° C. and 675° C. in the presence of steam to produce styrene, wherein a plurality of reaction stages are employed, the improvement which comprises: passing the reaction effluent to an indirect heater between said stages for a residence time of less than 5 seconds, a maximum pressure drop of 10 p.s.i. across the heat exchanger, and a maximum skin temperature of 790° C.

2. A process of claim 1 wherein there are two reactor stages.

3. A process according to claim 1 wherein the maximum skin temperature is 740° C.

4. A process according to claim 3, wherein the maximum skin temperature is 700° C.

5. A process according to claim 1 wherein the ethyl benzene feed contains at least 90% ethyl benzene.

6. A process according to claim 5 wherein the maximum skin temperature is 740° C.

7. A process according to claim 6 wherein the maximum skin temperature is 700° C.

References Cited
UNITED STATES PATENTS

| | | | |
|---|---|---|---|
| 2,851,502 | 9/1958 | Bowman et al. | 260—669 |
| 3,205,179 | 9/1965 | Soderquist et al. | 260—669 X |
| 3,209,049 | 9/1965 | Pitzer | 260—669 X |

DELBERT E. GANTZ, *Primary Examiner.*

C. R. DAVIS, *Assistant Examiner.*